United States Patent [19]
Backus et al.

[11] Patent Number: 5,644,424
[45] Date of Patent: Jul. 1, 1997

[54] LASER AMPLIFIER AND METHOD

[75] Inventors: Sterling Backus; Henry C. Kapteyn; Margaret M. Murnane, all of Ann Arbor, Mich.

[73] Assignee: Washington State University Research Foundation, Pullman, Wash.

[21] Appl. No.: 619,275

[22] Filed: Mar. 18, 1996

[51] Int. Cl.$^6$ .................................................. H01S 3/00
[52] U.S. Cl. ........................................ 359/347; 359/348
[58] Field of Search ...................................... 359/347, 348

[56] References Cited

U.S. PATENT DOCUMENTS

| | | |
|---|---|---|
| 3,365,671 | 1/1968 | Kogelnik . |
| 3,597,695 | 8/1971 | Swain et al. . |
| 3,706,939 | 12/1972 | McLafferty . |
| 4,019,151 | 4/1977 | Brueckner et al. . |
| 4,156,852 | 5/1979 | Hagen . |
| 4,191,928 | 3/1980 | Emmett ............................ 330/4.3 |
| 4,205,278 | 5/1980 | George et al. ................. 331/94.5 P |
| 4,243,942 | 1/1981 | Glass ............................... 330/4.3 |
| 4,422,046 | 12/1983 | Mumola et al. ................. 330/4.3 |
| 4,918,395 | 4/1990 | Difonzo et al. . |
| 5,172,263 | 12/1992 | Hale . |
| 5,268,787 | 12/1993 | McIntyre . |
| 5,272,560 | 12/1993 | Baney et al. . |
| 5,400,350 | 3/1995 | Galvanauskas . |

OTHER PUBLICATIONS

Backus et al., "Ti:sapphire Amplifier Producing Millijoule-Level, 21-fs Pulses at 1 kHz," *Opt. Lett.* 20:2000–2002 (1995).

Fork, "Amplification of Femtosecond Optical Pulses Using a Double Confocal Resonator," *Opt. Lett.* 14:1068–1070 (1989).

Georges, "High-Efficiency Multipass Ti:sapphire Amplifiers for a Continuous-Wave Single-Mode Laser," *Opt. Lett.* 16:144–146 (1991).

Le Blanc, "Compact and Efficient Multipass Ti–sapphire System for Femtosecond Chirped-Pulse Amplification at the Terawatt Level," *Opt. Lett.* 18:140–142 (1993).

Lemoff, "Quintic-Phase-Limited, Spatially Uniform Expansion and Recompression of Ultrashort Optical Pulses," *Opt. Lett.* 18:1651–1653 (1993).

Lenzner, "Sub-20-fs, Kilohertz-Repetition-Rate Ti:sapphire Amplifier," *Opt. Lett.* 20:1397–1399 (1995).

Macklin et al., "High-Order Harmonic Generation Using Intense Femtosecond Pulses," *Phys. Rev. Lett.* 70:766–769 (1993).

Rudd et al., "Chirped-Pulse Amplification of 55-fs Pulses at a 1-kHz Repetition Rate in a Ti:Al$_2$O$_3$ Regenerative Amplifier," *Opt. Lett.* 18:2044–2046 (1993).

(List continued on next page.)

*Primary Examiner*—Mark Hellner
*Attorney, Agent, or Firm*—Klarquist Sparkman Campbell Leigh & Whinston, LLP

[57] ABSTRACT

Laser amplifiers and methods for amplifying a laser beam are disclosed. A representative embodiment of the amplifier comprises first and second curved mirrors, a gain medium, a third mirror, and a mask. The gain medium is situated between the first and second curved mirrors at the focal point of each curved mirror. The first curved mirror directs and focuses a laser beam to pass through the gain medium to the second curved mirror which reflects and recollimates the laser beam. The gain medium amplifies and shapes the laser beam as the laser beam passes therethough. The third mirror reflects the laser beam, reflected from the second curved mirror, so that the laser beam bypasses the gain medium and returns to the first curved mirror, thereby completing a cycle of a ring traversed by the laser beam. The mask defines at least one beam-clipping aperture through which the laser beam passes during a cycle. The gain medium is pumped, preferably using a suitable pumping laser. The laser amplifier can be used to increase the energy of continuous-wave or, especially, pulsed laser beams including pulses of femtosecond duration and relatively high pulse rate.

21 Claims, 3 Drawing Sheets

OTHER PUBLICATIONS

Sarukura et al., "Ultrashort Pulse Generation from a Passively Mode–Locked Ti:Sapphire Laser Based System," *IEEE J. Quantum Electron.* 28:2134–2141 (1992).

White et al., "Compensation of Higher–Order Frequency–Dependent Phase Terms in Chirped–Pulse Amplification Systems," *Opt. Lett.* 18:1343–1345 (1993).

Wynne et al., "Regenerative Amplification of 30–fs Pulses in Ti:sapphire at 5 kHz," *Opt. Lett.* 19:895–897 (1994).

Zhou et al., "Generation of 21–fs Millijoule–Energy Pulses by Use of Ti:sapphire," *Opt. Lett.* 19:126–128 (1994).

LASER AMPLIFIER AND METHOD

ACKNOWLEDGE

Research leading to this invention was supported by grant no. DE-FG06-93ER12135 from the U.S. Department of Energy. The government has rights in this invention.

FIELD OF THE INVENTION

This invention pertains to lasers, particularly to laser amplifiers, combinations of lasers and laser amplifiers, and methods for increasing the energy of a laser beam.

BACKGROUND OF THE INVENTION

Heretofore, many schemes have been devised for amplifying a pulsed or continuous-wave laser beam. As used herein, a "laser amplifier" is a device operable to increase the energy of a light beam by exploiting the principle of stimulated emission.

Early laser amplifiers were single-pass, meaning that the incident light beam passed only once through an "active medium." An active medium as used in a laser amplifier according to the present invention is a substance that, upon receiving a suitable dose of energy, exhibits stimulated emission of radiation that can boost the energy level of (i.e., "amplify") a beam passing through the substance. An active medium is also termed a "gain medium" or "amplifying medium" because the substance imparts "gain" (i.e., an increase in energy level or an amplification) to the beam passing through the gain medium. In many instances, the amount of gain imparted to an incident beam passing once through an active medium in a laser amplifier is small. Hence, many prior-art laser amplification schemes involve passing the laser beam through multiple laser amplifiers in a cascade arrangement to produce sufficient cumulative gain for the intended use of the laser beam. Unfortunately, such schemes tend to be large and expensive.

Other prior-art schemes involve "multiple-pass" laser amplifiers in which the incident beam is made to pass multiple times through a unit of gain medium. Multiple-pass arrangements can impart substantial cumulative gain to a laser beam without the need for cascading and with relatively high efficiency. The beam is typically routed, using multiple reflective mirrors, back and forth or around one or more circumferential paths having any of various desired geometric profiles. (Each such circumferential path is termed herein a "ring".) In instances in which the beam makes multiple circumferential traversals of the same ring, each traversal around the ring is termed herein a "cycle." Cycles can be configured "off-axis" allowing, for each cycle, the beam to impinge upon and thus pass through the unit of gain medium at a slightly different angle. For representative prior-art multiple-pass laser amplification schemes, reference is made, for example, to U.S. Pat. No. 3,365,671 to Kogelnik, and U.S. Pat. No. 4,156,852 to Hagen.

In conventional multiple-pass laser amplifiers, the beam may exhibit any of various undesirable spatial intensity fluctuations such as ripples, rings, and holes. These fluctations represent a substantial departure from a normally ideal Gaussian transverse intensity profile of the beam, and can arise, for example, from diffraction and scattering by optical defects and particles in the air or on optical surfaces. These fluctuations in multiple-pass amplifiers tend to be cumulative and can result in serious degradation of the beam and damage to optical components of the amplifier.

Additionally, prior-art multiple-pass laser amplifiers suffer from various drawbacks and thus are limited to certain applications. For example, regenerative amplifier configurations have proven to be difficult to use for producing laser pulses having both high energy and extremely short duration. This is due, inter alia, to the relatively broad spectral bandwidth of short pulses. Regenerative amplifier configurations employing Ti:sapphire crystals are disclosed in, e.g., Rudd et al., *Opt. Lett.* 18:2044 (1993); and Wynne et al., *Opt. Lett.* 19:895 (1994). Regenerative amplifier configurations tend to have a large number of optical components that collectively operate over spectral bandwidths that simply are too narrow for producing extremely short pulses.

Ti:sapphire laser amplifiers have been developed that use the technique of chirped-pulse amplification to attain high peak powers (e.g., terawatt) with extremely short (e.g., femtosecond) pulse durations. Strickland et al., *Opt. Commun.* 56:219 (1985); and Zhou et al., *Opt. Lett.* 20:64 (1995). Such laser systems are capable of producing terawatt power levels, but at repetition rates of 10 Hertz or less. Also, such devices are typically bulky. For certain applications, a higher repetition rate would be advantageous, even with some sacrifice of the peak power.

Thus, there is a need for further refinement of laser amplifiers, including laser amplifiers capable of producing high-energy laser pulses of extremely short (femtosecond) duration and high (kHz) repetition rate, and excellent beam quality.

SUMMARY OF THE INVENTION

The aforementioned need is met by the present invention which provides, inter alia, laser amplifiers and methods for amplifying a laser beam.

According to general aspects of the present invention, a laser amplifier is provided that comprises first and second curved mirrors, a unit of gain medium, a third mirror, and a mask. Each of the curved mirrors has a focal point. The unit of gain medium is situated between the first and second curved mirrors at the focal point of each curved mirror. The first curved mirror directs and focuses a laser beam to pass through the gain medium to the second curved mirror, the second curved mirror reflects and recollimates the laser beam, and the gain medium amplifies and shapes the laser beam as the laser beam passes through the gain medium. The third mirror is disposed relative to the first and second curved mirrors so as to reflect the laser beam, reflected from the second curved mirror, in a manner serving to cause the laser beam to bypass the gain medium and return to the first curved mirror, thereby completing a cycle of a ring traversed by the laser beam. The mask defines at least one beam-clipping aperture through which the laser beam passes during a cycle.

A preferred embodiment of the present invention has one or more of the following additional features: (a) the gain medium medium has a gain region on which the first curved mirror focuses the laser beam during each cycle; (b) the focal lengths of the first and second curved mirrors are equal; (c) the third mirror is planar; (d) the ring comprises multiple cycles that are separate from each other but cross each other at the gain medium; (e) the mask defines multiple apertures, one for each cycle, that are arranged linearly on the mask; (f) all the apertures have the same diameter; and (g) the mask is situated far field relative to the gain medium.

Also according to a preferred embodiment, the laser amplifier includes a gain-medium pump for energizing the gain medium sufficiently to amplify the laser beam as the laser beam passes through the gain medium. Preferably, the gain-medium pump is a laser that operates to introduce a pumping laser beam into the gain medium sufficient to energize the gain medium.

According to another aspect of the present invention, an amplified laser is provided that includes, in addition to a laser amplifier as briefly described above, (a) a source laser that produces a source laser beam for injection into the ring of the laser amplifier, a beam injector serving to introduce the source beam into the ring, and a beam extractor serving to direct an amplified laser beam from the ring.

According to another aspect of the present invention, a method is provided for amplifying a laser beam. In the method, a laser beam is introduced into a ring of a laser amplifier that includes a gain medium. The introduced laser beam is cycled in the ring; during each cycle, the laser beam is focused to impinge upon and pass through a pumped region in the gain medium so as to increase the energy of the laser beam. After passing through the pumped region, the laser beam is recollimated and bypassed around the gain medium to complete the cycle. Also, during each cycle, the laser beam is clipped, preferably by passing the laser beam through an orifice defined by a mask disposed transversely to the laser beam in the cycle.

Other aspects of the present invention will be apparent from the following detailed description, drawings, and claims.

DETAILED DESCRIPTION

According to the present invention, a laser amplifier is provided that is capable, inter alia, of producing a substantially improved increase (relative to prior-art systems) in energy of a pulsed laser beam while maintaining an extremely short (femtosecond) pulse duration and high (kHz) repetition rate. I.e., a laser amplifier according to the present invention represents a significant increase in available peak powers because it combines, when used to amplify a pulsed laser beam, both high pulse energy and short pulse duration.

A laser amplifier according to the present invention is particularly suitable for use in amplifying extremely short (e.g., femtosecond-range) laser pulses. However, it can also be used for amplifying longer laser pulses as well as continuous-wave (CW) laser beams. As used herein, the general term "laser beam" shall be understood to be either a pulsed beam or a CW beam, depending upon the particular application of the laser amplifier. To "amplify" a laser beam simply means to increase its intensity, i.e., to make it "brighter."

Figures 1, 2A, 2B, 3:
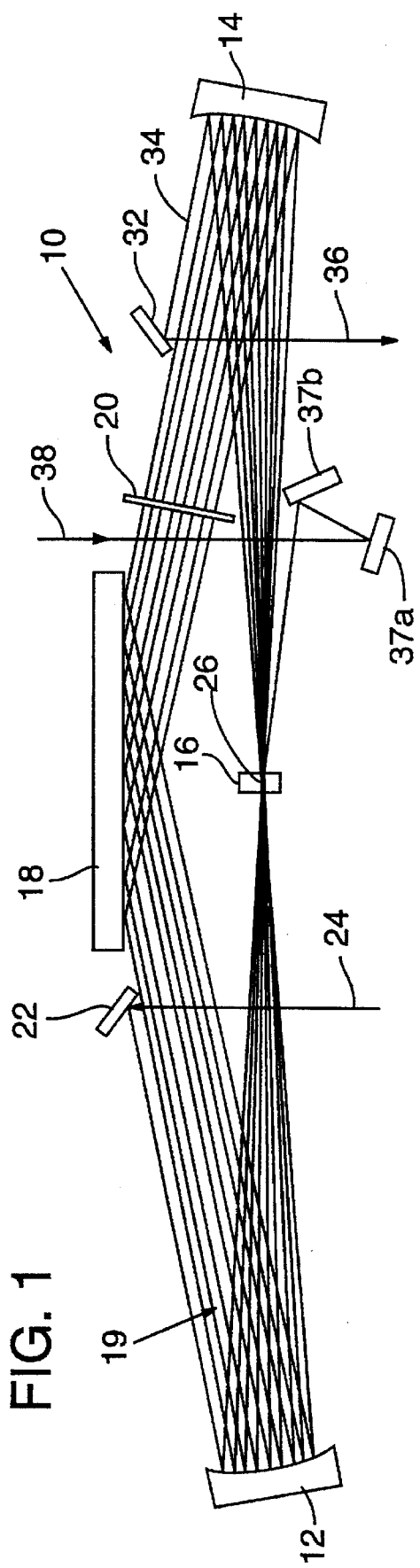
FIG. 1 is a schematic diagram showing a representative preferred embodiment of a laser amplifier according to the present invention, showing approximate paths traversed by a laser beam in the amplifier.
FIG. 2A is a plan view of a mask usable in the laser amplifier of FIG. 1.
FIG. 2B schematically depicts representative changes to the transverse energy profile of a cycle beam as the beam passes through an orifice defined by the mask.
FIG. 3 schematically depicts "reflection spots" on a curved mirror of the laser amplifier of FIG. 1, each reflection spot produced by a separate cycle beam in the laser amplifier.

A representative embodiment, not intended to be limiting, of a laser amplifier according to the present invention is depicted schematically in FIG. 1. The laser amplifier 10 comprises a first curved mirror 12, a second curved mirror 14, a unit of "gain medium" 16, at least one third mirror 18, and a mask 20. Each of the curved mirrors has a focal point. The gain medium 16 is disposed between the first and second curved mirrors 12, 14 such that the focal points of the curved mirrors 12, 14, coincide at the gain medium 16.

As can be seen in FIG. 1, a laser beam is reflected from and focused by the first curved mirror 12 so as to pass through the gain medium 16 to the second curved mirror 14 from which the laser beam is reflected and recollimated. The third mirror 18 is disposed relative to the first and second curved mirrors 12, 14 to reflect the laser beam, reflected from the second curved mirror 14, in a manner completing a "ring" 19 (as defined above). I.e., the laser beam reflected by the third mirror 18 bypasses the gain medium 16 and returns to the first curved mirror 12 to complete each of multiple "cycles" traversed by the laser beam in the ring 19. For illustrative purposes only and not meant to be limiting, FIG. 1 depicts a ring 19 composed of eight cycles. The cycles can be regarded as belonging to the same ring even though, as suggested by FIG. 1, the cycles do not completely overlap. This is because each cycle is defined by the same mirrors.

A source beam ("input beam") 24 to be amplified is introduced into the ring 19 using a "beam injector" which can simply comprise one or more mirrors 22 disposed relative to the ring so as to reflect the incoming source beam from an extraneous source (particularly a laser) into the ring 19. FIG. 1, for example, shows the mirror 22 disposed so as to reflect the incoming source beam 24 toward the first curved mirror 12. The source beam 24 preferably has a degree of collimation suitable for the particular amplifier configuration, power, and size.

The focal lengths of the first and second curved mirrors 12, 14 are preferably the same, but can be different. Whenever the focal lengths are the same, the gain medium 16 is situated equidistant from each of the first and second curved mirrors 12, 14. Use of curved mirrors having unequal focal lengths may make it more difficult to have the beams in the cycles comprising the ring 19 cross in a suitably small focal region at the gain medium.

The third mirror 18 is preferably a flat mirror. Although FIG. 1 shows only one mirror 18 used to complete the ring 19, it will be understood that more than one such mirror can be used. With only one such mirror, the FIG. 1 embodiment provides a ring 19 having a triangular profile, wherein the laser beam propagating around the ring reflects from the third mirror 18 at relatively large angles of incidence and reflection. Under conditions in which it may be advantagous to reduce the angles of incidence and reflection from mirrors used to bypass the laser beam around the gain medium, multiple flat mirrors can be used. For example, use of two flat mirrors rather than the single mirror 18 would create a ring having a square, rectangular, or trapezoidal profile.

The mirrors 12, 14, 18 can be made of any suitable material, and persons of ordinary skill in the relevant art will be aware of various candidate materials used in prior-art multiple-pass laser amplifiers. For example, and not intended to be limiting, the flat mirror 18 can be a glass substrate with, for certain wavelengths, a gold reflective surface formed by evaporation or other suitable process. Other types of reflective surfaces and/or substrates are more suitable for other wavelengths and are discussed in a voluminous literature in the art.

The curved mirrors 12, 14 can be made of glass with a suitable reflective surface. For example, a multi-layer dielectric coating (made of non-absorptive materials to avoid damage) can be used as the reflective surface. For convenience, the first and second curved mirrors can be spherically concave; they can also have some other suitable concave profile such as parabolic. A non-spherical profile may be better than spherical for minimizing aberrations.

The gain medium 16 is any suitable laser medium that can exhibit stimulated emission when appropriately pumped, that can amplify the wavelength of the source beam at its particular wavelength, that can produce a desired wavelength of amplified laser light, that has a suitable bandwidth over which it can produce optical gain, and that is sufficiently stable to withstand thermal and other demanding conditions during use in the laser amplifier. Persons of ordinary skill in the art will have a knowledge, from a familiarity with a large body of literature dealing with various types of laser amplifiers, of candidate materials from which the gain medium can be made.

Representative crystalline materials of which the gain medium can be made include, but are not limited to: Ti:sapphire, Nd:YAG, Nd:glass, ruby, Yb:glass, Cr:YAG, and Cr:LiSAF. (Ti:sapphire is especially suitable for producing very short laser pulses.) In addition to crystalline materials, the gain medium can also be a dye or gas having lasing properties; but, it is preferable that such non-crystalline materials be capable of providing, like crystalline materials, a suitably small region ("pump spot") that is pumped and in which gain occurs to ensure satisfactory beam reshaping as the beam passes through the gain medium and is amplified.

A crystalline gain medium can have any of several possible orientations, such as a "normal-incidence" or "Brewster angle" orientation. In a normal-incidence orientation, the face of the crystal through which laser beams pass is approximately perpendicular to the angle of incidence of the beams. In a Brewster-angle incidence, the crystal is oriented at an angle of incidence where light of a particular polarization does not reflect. Whereas a Brewster-angle orientation normally eliminates any need for an anti-reflection coating on the crystal, an antireflection coating is not otherwise required. Rather, an antireflection coating serves mainly to minimize energy loss from the beam being amplified.

In each cycle, the laser beam propagating around the ring 19 passes once through the gain medium and is thus amplified. The gain experienced per pass (i.e., per cycle) is similar to that experienced with conventional multipass laser amplifiers, and is affected by most if not all the same variables.

When a source beam 24 is injected into the amplifier 10, the beam (as it propagates around the ring 19 in a cycle) is focused by the first curved mirror 12 at the focal point 26 of the first curved mirror 12. The multiple cycles of the ring are preferably aligned so that the each cycle crosses the others at the focal point 26 at which the gain medium 16 is situated.

The depth of overlap near the focal point occupied by crossing cycle beams normally decreases as the number of cycles is increased or as the angle between passes increases. A shorter depth of overlap makes efficient extraction of energy from the amplifier more difficult. The most compact crossing of cycle beams at the focal point 26 occurs when all cycle beams in the ring lie in a single plane as shown in FIG. 1. To accommodate more cycles it is possible to stagger the reflection points on the mirrors in, for example, multiple vertically displaced rows, but this usually results in increasing the size of the region 26 and changing the shape of the region 26 from circular to helical.

The mask 20 comprises any suitable material normally opaque to the laser beam. The mask 20 can be made entirely of the opaque material (e.g., aluminum) or can comprise a suitable substrate (e.g., glass) bearing an opaque surficial coating. In any event, the mask defines, preferably for each cycle, a separate "beam-clipping" aperture through which the cycle beam passes. Thus, for a ring consisting of eight cycles, the mask would preferably have eight apertures, one for each cycle. Alternatively, the beam can be extracted during the last cycle after passing through the gain medium but before passing through an aperture, resulting in n−1 apertures fern cycles. Preferably, each aperture is circular, but can have a different profile under certain conditions. Also, each of multiple circular apertures preferably has the same diameter, but variations in aperture diameter can be beneficial in certain instances.

As stated above, an aperture preferably "clips" the corresponding cycle beam and thereby desirably keeps the diameter of the beam impinging on the gain medium suitably small for maximal gain efficiency. Thus, the aperture has a diameter smaller than the diameter of the corresponding cycle beam. As used herein, "clipping" means obstructing passage through the aperture of peripheral portions of the transverse energy profile of the beam, forming abrupt edges to the profile.

Although abrupt profile edges tend to generate annular diffraction rings as the beam propagates in space, not clipping a cycle beam using the mask allows the diameter of the corresponding "spot" on the curved mirrors where the cycle beam impinges to undesirably increase on each successive pass. If the cycle beams were allowed to increase in diameter to the point where successive cycles overlap, a beam would no longer be extractable cleanly from the amplifier 10.

When the cycle beam passes through the gain medium, the beam not only acquires an energy gain, but also the beam desirably undergoes "reshaping." That is, due to the small volume of the pumped region of the gain medium, the center of the Gaussian profile of the cycle beam is amplified relative to any annular diffraction rings borne by the cycle beam incident on the gain medium. This effect is analogous to "spatial filtering" as known in the art.

The mask 20 also reduces amplified spontaneous emission (ASE) and compensates for any thermal lensing of the gain medium 16 due to high average pump power. Reduction of ASE is desirable because ASE emitted in the propagation direction of the cycle beam is amplified as a parasitic component of the amplified beam. Thermal lensing is a deformation, caused by high temperature, of the gain medium that confers undesirable lenticular properties to the gain material. Excessive thermal lensing can result in an undesirable reduction in the size of the pumped region in the gain medium, thereby reducing the efficiency by which the cycle beam extracts pump energy from the gain medium and increasing the probability of causing damage to the gain medium by the amplified cycle beams. Excessive thermal lensing can also cause an excessive increase in cycle-beam diameter per pass through the gain medium.

A representative preferred embodiment of a mask 20 is shown schematically in FIG. 2A, defining eight apertures 21 arranged linearly across the mask. FIG. 2B schematically illustrates beam clipping. An incident cycle beam 23 having a transverse Gaussian energy profile 25 passes through a corresponding aperture 21 in the transversely oriented mask 20. The beam 27 that has just passed through the aperture 21 has had peripheral portions of its transverse energy profile 29 "clipped" yielding more abrupt sides to the energy profile. After subsequent propagation through space, the transverse energy profile 33 of the beam 35 acquires transverse ripples and rings due to diffraction and other effects.

As stated above, it is preferred that all cycle beams lie in a single plane to maintain the size of the region 26 on the gain medium 16 where the cycle beams cross as small as possible. In such a scheme, each cycle beam preferably reflects off-axis from a different location on the surface 28 of, for example, the first curved mirror 12, as shown in FIG. 3 wherein the reflection points 30 are arranged linearly.

The mask 20 can be situated in any of several "far-field" locations in the ring 19. As used herein, "far field" means a location away from the focal point of the curved mirrors. In the amplifier 10, the focal point (also termed "near field") is represented by the location of the gain medium 16. A near-field location of the mask is not desirable because of the high light intensity at that location and because the cycle beams are too close together at that location for clean separation and clipping by the mask. (The gain medium itself performs the function of a near-field aperture.) The optimal far-field position of the mask depends largely on the characteristics of the source beam, e.g., whether the source beam is divergent or not.

An amplified cycle beam is "extracted" from the ring 19 using a "beam extractor" which can simply comprise one or more extractor mirrors 32 disposed relative to the ring so as to reflect the beam, after having propagated in the ring the desired number of cycles, outside the amplifier 10. FIG. 1, for example, shows the extractor mirror 32 disposed so as to reflect the beam 34 (reflected from the second curved mirror 14) and thus form an exit beam 36.

As in conventional multipass laser amplifiers, the gain medium 16 is pumped to cause the gain medium to exhibit stimulated emission (i.e., a population inversion) sufficient to impart an increase in intensity to the cycle beam as the cycle beam passes through the gain medium. The preferred "gain-medium pump" is a suitable laser, but other gain-medium pumps can be employed, depending inter alia upon the particular type of gain medium being utilized in the amplifier. The gain-medium pump must generate energy having a magnitude and profile sufficient to stimulate the desired optical gain in the gain medium. If the gain-medium pump is a laser, its beam must have a focusability that is appropriate for the cycle beams being amplified and a wavelength appropriate for exciting the particular gain medium in the amplifier. Furthermore, if used in a pulse mode, the duration of pulses produced by the gain-medium pump would preferably be no longer than the energy storage time of the gain medium.

Mirrors 37a, 37b or other suitable beam-directing components can be employed to introduce a pump beam 38 into the ring 19. Preferably, the pump beam 38 has an orientation that is colinear or nearly colinear with the cycle beams, especially with the final cycle beam.

As an alternative to using a pump laser, certain gain media can be energized using other energy sources such as gas discharge (e.g., if the gain medium is a gas), electrical (e.g., if the gain medium is a diode laser), flashlamp, or chemical. As a person of ordinary skill in the relevant art will appreciate, virtually any suitable pumping scheme can be used, so long as it is appropriate for the particular gain medium used in the amplifier.

Methods according to the present invention comprise passing the beam through a beam-clipping aperture while the beam is traversing at least one cycle in a ring of a multi-pass laser amplifier. Each such aperture, normally defined by a mask as described above, operates in conjunction with the soft "aperture" provided by the gain medium to reshape the spatial profile of the laser beam in the corresponding cycle, thereby preserving high beam "quality." This filtering action tends, inter alia, to counter the effects of thermal lensing in the gain medium, enlargement of the far-field beam due to a relatively small size of the "gain region" of the gain medium (i.e., the region of the gain medium that when pumped exhibits sufficient stimulated emission to impart gain to a cycle beam passing through the region), and astigmatism. Such filtering is particularly beneficial whenever the laser amplifier is being used to produce a high average power output. As discussed above, the exact far-field position of the aperture(s) within the ring can be varied as conditions dictate. The aperture limits the size (diameter) of the beam by clipping it. After clipping, the beam is focused into the gain medium. Since, inter alia, the region in the gain medium where gain occurs is normally relatively small, peripheral ripples and rings in the transverse energy profile of the beam selectively will not be amplified by the gain medium. Thus, the cycle beam is spatially filtered in a manner that smooths the spatial profile of the beam, resulting in near diffraction-limited spatial beam quality.

Alternatively, such filtering action can occur as the cycle beam traverses from near-field to far-field in a cycle. An aperture disposed in the near field (i.e., at the focus of the beam) can create a series of diffraction rings in the far-field as the beam propagates away from the focus—a so-called "Airy disk" pattern. Such rings can be clipped by an aperture of appropriate size, thus improving beam quality.

Also, as discussed above, the apertures need not all be the same size. Varying the aperture size can be useful for changing the spot size in the gain medium, thus altering the mode-matching properties of the amplifier and optimizing the efficiency with which gain energy is obtained from the gain medium.

Example Embodiment

Figure 4:
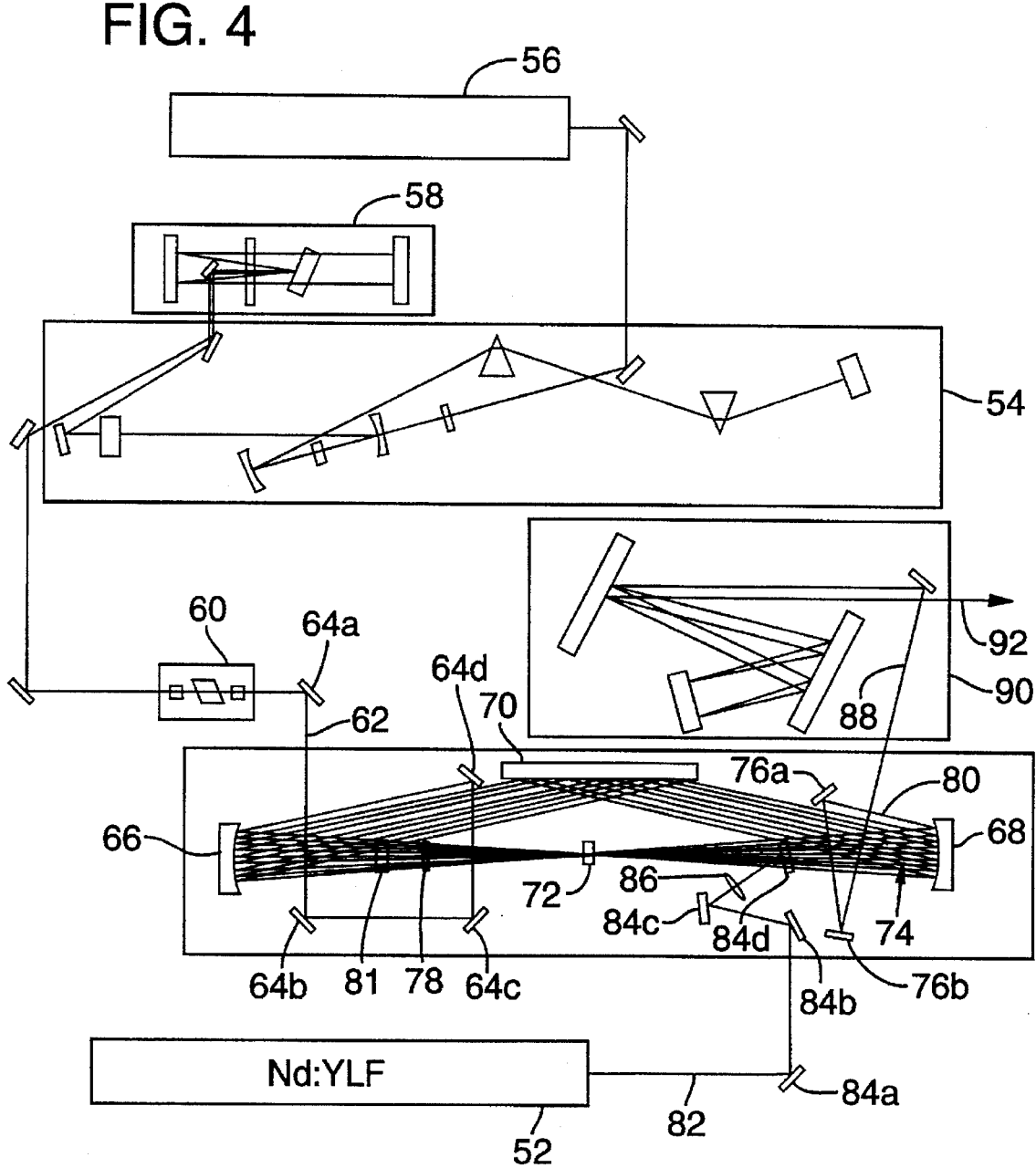
FIG. 4 schematically depicts a laser amplifier according to the Example Embodiment, together with peripheral components and a tracing of the paths traversed by laser beams.

This Example Embodiment, as schematically depicted in FIG. 4, is directed to a laser amplifier that, including pump laser, injector laser, and peripheral equipment, can easily fit on one optical table. The amplifier is used to amplify a beam produced by a pulsed laser, wherein the output pulses from the amplifier have a typical energy of 1.0 mJ, a pulse duration of 20–22 fs, a repetition rate of 1 KHz, and a gain of $10^6$ relative to the injected source beam. The amplifier ring preferably has eight cycles but can have more, up to thirty. The amplifier is more than 10 percent efficient, and exhibits an output shot-to-shot energy fluctuation of less than two percent. The output beam focuses to 1.8 times the diffraction limit. The amplifier configuration substantially minimizes astigmatism and reduces material dispersion compared to conventional regenerative amplifiers employing, for example, intracavity Pockels cells.

FIG. 4 depicts an amplifier 50 according to the present invention. The amplifier 50 has a gain medium that is pumped using a "pump laser" 52. The pulsed laser beam to be amplified is generated by an "injector oscillator" 54 pumped as described below.

The "injection oscillator" 54 is a self-mode-locked laser oscillator utilizing a KLM Ti:sapphire active material, as described in detail in Asaki et al., *Opt. Lett.* 18:977 (1994), incorporated herein by reference. The injection oscillator 54 is pumped with 5 W of power from an Ar-ion laser 56 (Spectra-Physics) and produces 4-nJ 15-fs (femtosecond) pulses.

The pulses from the injection oscillator 54 are stretched to about 45 ps (45 picoseconds) each by an all-reflective pulse stretcher 58. The pulse stretcher 58, described in Zhou et al., *Opt. Lett.* 20:64 (1995); and Zhou et al., *Opt. Lett.* 19:126 (1994), both of which are incorporated herein by reference, comprises a grating and a telescope with a magnification factor of 1, both in a double-pass configuration.

The 2-nJ, 45-ps pulses from the pulse stretcher 58 then travel through a KD*P (potassium dideuterium phosphate) Pockels cell 60 (Quantum Technology) between crossed calcite polarizers. The Pockels cell 60 permits transmission of a single pulse during a 7-ns window that is timed to the injection oscillator 54 through a frequency divider (not shown). The extinction of the polarizers in the Pockels cell in the off state is greater than $10^4$. The frequency divider receives a 91-MHz signal from the injection oscillator 54 and divides this rate to 1 kHz for input to the amplifier 50.

The output of the Pockels cell 60 serves as the source beam 62 providing "seed pulses" to the amplifier 50, wherein the source beam 62 is reflected from a series of mirrors 64a–64d for proper orientation for injection purposes. The diameter of the source beam 62 is 2 mm.

The amplifier 50 comprises first and second dielectric-coated curved mirrors 66, 68 and a planar 10.6-cm third mirror 70 having a gold reflective surface. Each of the curved mirrors 66, 68 has a 100-cm circumferential radius and a nominally 50-cm focal length. The two curved mirrors 66, 68 are separated from each other by the sum of their focal lengths, i.e., by 100 cm, with the gain medium 72 interposed at mid-length between the curved mirrors 66, 68. The third mirror 70 is oriented perpendicularly to the curved mirrors 66, 68, about 15 cm away from an axis line intersecting the two curved mirrors 66, 68, thereby forming a triangular ring 74. With such a configuration, a laser beam can make from one to about 30 separate cycles around the ring 74, with each cycle reflecting from a different location on the surface of each mirror 66, 68, 70. The amplifier 50 also comprises a mask 78 defining apertures as described generally above.

Beam extractor mirrors 76a, 76b extract an exit beam 80 from the ring 74 after the desired number of cycles. The beam extractor mirrors 76a, 76b alleviate any need for a Pockels cell or polarizers as used in conventional regenerative amplifiers.

In the amplifier 50 of this Example Embodiment, the ring 74 preferably comprises eight Cycles in a single plane. When a source beam is introduced into the ring, the beam is repeatedly focused on a "crossing region" on the gain medium by the first curved mirror. In a ring consisting of eight cycles, the center of each cycle beam is within 150 μm of the center of any other cycle beam at the crossing region; also, as the cycle beams emerge from the crossing region, the angular separation between the first cycle beam and the final cycle beam is about 5 degrees.

The gain medium 72 is a 0.5-cm long and 1.0-cm diameter antireflection-coated normal-incidence Ti:sapphire crystal (Union Carbide) with 0.2% doping.

The pump laser 52 for the amplifier 50 is a Quantronix Model 527 DP-H frequency-doubled multimode Nd:YLF laser (Excel/Quantronix), which produces up to 20 W of 527-nm light at 1 kHz. The pump beam 82 is focused into the gain medium 72 using appropriate mirrors 84a–84d and a lens 86. The "spot" on the gain medium 72 produced by the pump beam 82 is approximately 800 μm ($1/e^2$ diameter), compared to an about 300-μm diameter spot produced by the source beam on the gain medium 72.

On a first pass of the pump beam 82 through the gain medium 72, the gain medium absorbs 74 percent of the energy of the pump beam 82. Residual energy in the pump beam 82 is refocused back into the gain medium from the opposing side using a mirror 81. The gain medium 72 is cooled to about 10° C. to remove excess heat during use.

Day-to-day alignment of the entire amplifier system normally takes about 10 min., and amplifier warm-up time is about 30 min. The alignment consists of minor adjustments to the mirrors 64c, 64d.

The mask 78 defines a linear series of 1-mm diameter apertures; during each cycle, the beam passes through a separate aperture. The mask 78 is disposed "far field" about 22 cm before the gain medium 72. The mask 78 is operable to reduce ASE and compensate for thermal lensing of the gain medium 72 due to high average pump power (typically 15 W). Simultaneously, the beam is focused to a smaller spot size in the gain medium 72. This helps maintain optimal utilization of pump energy by the gain medium 72, avoids damage to the gain medium, and limits cycle beam diameter which prevents overlap of cycle beams. (Overlap would otherwise make it difficult or impossible to extract the beam cleanly from the amplifier 50 after a desired number of cycles.)

For a pump pulse energy of 13.3 mJ (i.e., 13.8 mJ absorbed by the gain medium 72 from the pump beam 82) the output energy from the amplifier 50 is typically 1.6 mJ. Thus, the efficiency of conversion of pump energy to the output pulse energy is just over 10 percent.

After amplification, the pulses 88 are temporally compressed by a double pass on a grating pair in a compressor 90. The gratings in both the stretcher 58 and the compressor 90 have 600 grooves/mm (Milton Roy); the compressor 90 has a throughput efficiency of about 60 percent. The energy fluctuation of the compressor output 92 is typically less than 2 percent, both in shot-to-shot fluctuations and long term over an 8-hour period.

When seed pulses in the input beam 62 are amplified, their spectral width is reduced from 53 nm to about 40 nm. The laser spectrum from the oscillator 54 is preferably tuned to match the gain profile of the amplifier 50 as much as possible (so as to produce the broadest possible output spectrum from the amplifier 50).

Figure 5:
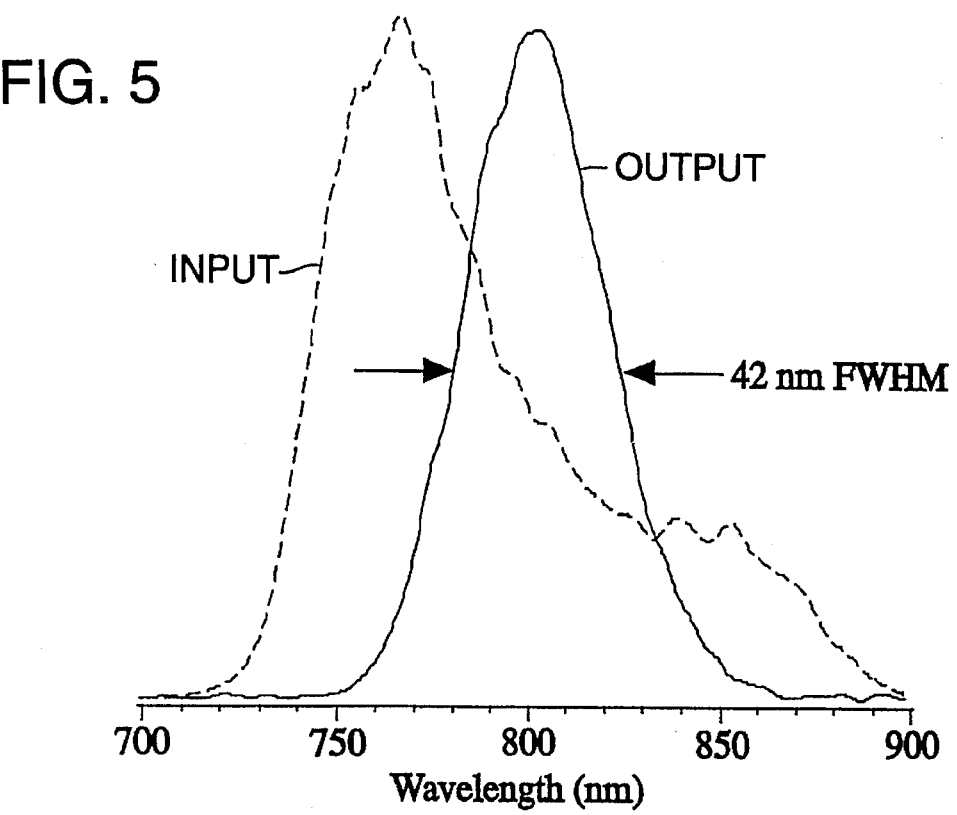
FIG. 5 is a plot of unamplified input and amplified output spectra of the multipass laser amplifier of the Example Embodiment.

A comparison between input and output spectra of the amplifier 50 is shown in FIG. 5. The oscillator 50 can operate with a wider spectrum and hence shorter pulses in the input beam than those shown in FIG. 5; but, widening the spectrum of the input beam would cause its spectral peak to shift to toward blue, away from the output spectrum of the amplifier. This would result in a narrower output spectrum from the amplifier, with correspondingly lower energy and longer duration pulses.

Spectral shaping and limiting in the amplifier 50 is a result of gain narrowing and finite grating reflectance bandwidth. Zhou et al., *Opt. Lett.* 20:64 (1995); Zhou et al., *Opt. Lett.* 19:126 (1994). The Fourier transform of the amplified output spectrum corresponds to an 18-fs FWHM (full width at half-maximum) pulse, or a 19 fs Gaussian pulse, which respectively agree well with experimental measurements of 20±fs, assuming a $sech^2$ shape, and 22±1 fs, assuming a Gaussian shape.

A single-shot autocorrelator geometry was used to measure the amplified pulse duration, with the data averaged over many pulses. The autocorrelator comprised a beam splitter, a delay line, and an appropriate compensating plate. The two beams were crossed in a 279-μm-thick KDP crystal at an angle of about 2 degrees. The second-harmonic emission from the KDP was then imaged onto a CCD (charge-coupled device) camera. The setup was calibrated by moving the delay line and correlating the position of the micrometer with the peak position of the autocorrelation trace. The data were then "read" into a computer.

Figure 6:
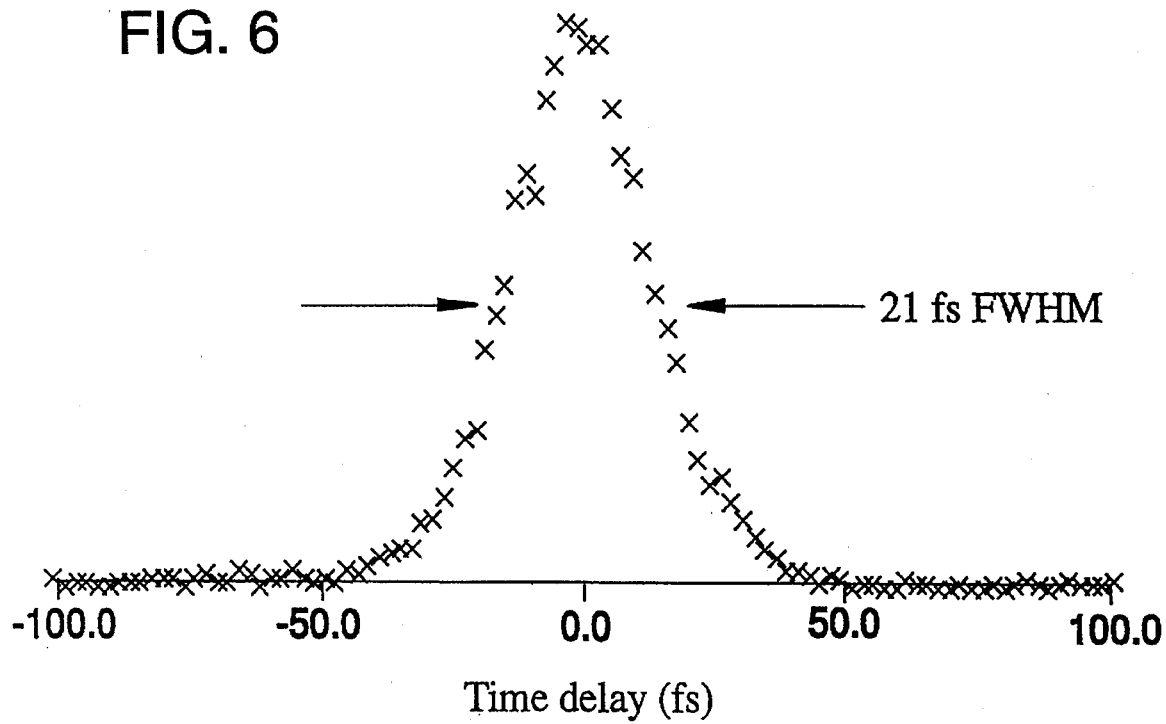
FIG. 6 is an autocorrelation trace and best fit to a sech$^2$ pulse shape of a 1.0 mJ pulse train produced by the Example Embodiment. The trace corresponds to a pulse with a FWHM pulse width of 21 fs.

An autocorrelation trace corresponding to a 21±1 fs pulse train is shown in FIG. 6. To determine the pulse duration, the autocorrelation of a $sech^2$ function was fitted to the data, yielding the FWHM of the laser pulse.

With the output pulse energy at 800 μJ the seed pulse was blocked, and the output energy decreased only to 200 μJ. This indicates that a quarter of the pulse energy is due to ASE, which tends to peak after the normal output pulse and has a duration of about 30 ns. However, when the seed pulse was present, the ASE was dramatically reduced (more than 95 percent) because the amplified pulse depletes the gain medium. To observe the ASE while the seed pulse was present, the output pulse was focused into a piece of glass, so that a large fraction of the seeded pulse was converted into broadly diverging white light. Because the ASE is much less intense (incompressible), it can pass undisturbed through the glass. A prism was used to separate a large portion of the white light from the ASE, which passed through a pinhole. Thus, when the seed pulse was injected into the amplifier, the ASE pulse was observed to virtually disappear compared with the ASE pulse in the instance where there was no seed pulse present.

When the seed pulse is injected the ASE carries at most 3 percent (rather than 25 percent) of the pulse energy, and possibly much less. The focusability was determined by focusing the output beam with f/220 optics into a CCD camera. The best focus had a diameter of 235 μm, with a Gaussian-like profile, and was slightly elliptical (0.75 ratio). This indicates that the beam is within 1.8 times the diffraction limit.

Thus, this Example Embodiment provides a simple, compact laser source capable of generating pulses of 1-mJ energy, with 21-fs pulse duration, and at a repetition rate of 1 kHz. The laser amplifier used in this Example Embodiment exhibits low ASE and good stability. Focusing a beam, produced by the amplifier, using f/5 optics would be expected to yield a peak intensity of about $10^{17}$ W/cm$^2$, at a repetition rate of 1 kHz. Thus, this Example Embodiment is ideal for high-repetition-rate x-ray sources, high-harmonic generation, and high-density plasmas.

While the invention has been described in connection with preferred embodiments, it will be understood that it is not limited to thos embodiments. On the contrary, the invention is intended to cover all alternatives, modifications, and equivalents as may be included within the spirit and scope of the invention as defined by the appended claims.

What is claimed is:

1. A laser amplifier, comprising:
    (a) first and second curved mirrors each having a focal point;
    (b) a gain medium situated between the first and second curved mirrors at the focal point of each first and second curved mirror, the first curved mirror being operable to direct and focus a laser beam to pass through the gain medium to the second curved mirror, the second curved mirror being operable to reflect and recollimate the laser beam, the gain medium being operable to amplify and shape the laser beam as the laser beam passes through the gain medium;
    (c) a third mirror disposed relative to the first and second curved mirrors, the third mirror being operable to reflect the laser beam, reflected from the second curved mirror, to cause the laser beam to bypass the gain medium and return to the first curved mirror to complete a cycle of a ring traversed by the laser beam; and
    (d) a mask disposed relative to the unit of gain medium, the mask defining, for each of at least some of the cycles constituting the ring, a separate beam-clipping aperture through which the laser beam passes.

2. The laser amplifier of claim 1, wherein the gain medium has a gain region, and the first curved mirror, during each cycle, focuses the laser beam on the gain region.

3. The laser amplifier of claim 1, wherein the focal lengths of the first and second curved mirrors are equal.

4. The laser amplifier of claim 1, wherein the third mirror is planar.

5. The laser amplifier of claim 1, wherein the ring comprises multiple cycles that are separate from each other but cross each other at the gain medium.

6. The laser amplifier of claim 5, wherein, during each cycle, the laser beam reflects off-axis from the first and second curved mirrors at a different location on said curved mirrors.

7. The laser amplifier of claim 6, wherein the apertures are arranged linearly on the mask.

8. The laser amplifier of claim 7, wherein all the apertures have the same diameter.

9. The laser amplifier of claim 1, wherein the mask is situated far field relative to the gain medium.

10. The laser amplifier of claim 1, further comprising a gain-medium pump operable to energize the gain medium sufficient for amplifying the laser beam.

11. The laser amplifier of claim 10, wherein the gain-medium pump comprises a laser disposed so as to introduce a pumping laser beam into the gain medium sufficient to energize the gain medium.

12. An amplified laser, comprising:
    (a) a laser amplifier, comprising (i) first and second curved mirrors each having a focal point; (ii) a gain medium situated between the first and second curved mirrors at the focal point of each first and second curved mirror, the first curved mirror being operable to direct and focus a laser beam to pass through the gain medium to the second curved mirror, the second curved mirror being operable to reflect and recollimate the laser beam, the gain medium being operable to amplify and shape the laser beam as the laser beam passes through the gain medium; (iii) a third mirror disposed relative to the first and second curved mirrors, the third mirror being operable to reflect the laser beam, reflected from the second curved mirror, to cause the laser beam to bypass the gain medium and return to the first curved mirror to complete a cycle of a ring traversed by the laser beam; (iv) a mask disposed relative to the unit of gain medium, the mask defining, for each of at least some of the cycles constituting the ring, a separate beam-clipping aperture through which the laser beam passes; and (v) a gain-medium pump operable to energize the gain medium sufficient for amplifying the laser beam;
    (b) a source laser operable to produce a source laser beam for injection into the ring;
    (c) a beam injector operable to introduce the source laser beam into the ring; and (d) a beam extractor operable to direct an amplified laser beam from the ring.

13. The amplified laser of claim 12, wherein the beam injector comprises at least one mirror disposed to direct the source laser beam into the ring.

14. The amplified laser of claim 12, wherein the beam extractor comprises at least one mirror disposed to direct the laser beam, after traversing the ring a desired number of cycles, out of the ring.

15. In a method for producing an amplified laser beam from a source beam by introducing the source beam into a laser amplifier in which the source beam traverses at least one cycle as a cycle beam around a ring that includes a pumped gain medium through which the cycle beam passes for amplification by stimulated emission, an improvement comprising: passing the cycle beam, as the cycle beam traverses the cycle in the ring, through a beam-clipping aperture defined by a mask disposed in the ring.

16. The improvement of claim 15, further comprising passing the cycle beam, as the cycle beam traverses each of multiple cycles in the ring, through a separate beam-clipping aperture defined by the mask.

17. The improvement of claim 16, wherein the apertures are disposed linearly on the mask.

18. A method for amplifying a laser beam, comprising the steps:

(a) passing the laser beam into a ring including a gain medium;

(b) cycling the laser beam in the ring wherein, during each cycle, the laser beam is focused to impinge upon and pass through a pumped region in the gain medium so as to increase the energy of the laser beam and, after passing through the pumped region, the laser beam is recollimated and bypassed around the gain medium to complete the cycle; and (c) during each of at least some of the cycles traversed by the laser beam in the ring, clipping the laser beam.

19. The method of claim 18, wherein, in step (b), the laser beam is reshaped by the gain medium as the laser beam passes through the pumped region.

20. The method of claim 18, wherein step (b) comprises, for each cycle, reflecting the laser beam from a first curved mirror, having a focal length and disposed the focal length from the gain medium, toward the pumped region; and reflecting the laser beam, after having passed through the pumped region, from a second curved mirror having a focal length and disposed the focal length from the gain medium opposite the first curved mirror.

21. The method of claim 18, wherein step (c) comprises passing the laser beam through an orifice defined by a mask disposed transversely in the cycle.

* * * * *

UNITED STATES PATENT AND TRADEMARK OFFICE
CERTIFICATE OF CORRECTION

PATENT NO. : 5,644,424
DATED : July 1, 1997
INVENTOR(S) : Backus et al.

It is certified that error appears in the above-identified patent and that said Letters Patent is hereby corrected as shown below:

Column 6, line 22, "fern" should be --for n--.

Signed and Sealed this

Sixteenth Day of June, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.    : 5,644,424                                                        Page 1 of 1
DATED         : July 1, 1997
INVENTOR(S)   : Backus et al.

It is certified that error appears in the above-identified patent and that said Letters Patent is hereby corrected as shown below:

<u>Column 1,</u>
Line 6, "Energy" should read -- Energy and by grant no. 9350405 from the National Science Foundation. --

Signed and Sealed this

Fourteenth Day of October, 2003

JAMES E. ROGAN
*Director of the United States Patent and Trademark Office*